United States Patent
Niioka et al.

(10) Patent No.: US 9,751,423 B2
(45) Date of Patent: Sep. 5, 2017

(54) VEHICLE CONTROL SYSTEM, VEHICLE INFORMATION PROVIDING DEVICE, AND VEHICLE INFORMATION PROVIDING METHOD

(71) Applicant: Nissan Motor Co., Ltd., Kanagawa (JP)

(72) Inventors: Hisashi Niioka, Kanagawa (JP); Naoki Yamamoto, Tokyo (JP)

(73) Assignee: NISSAN MOTOR CO., LTD, Kanagawa (JP)

( * ) Notice: Subject to any disclaimer, the term of this patent is extended or adjusted under 35 U.S.C. 154(b) by 0 days.

(21) Appl. No.: 14/429,244

(22) PCT Filed: Aug. 19, 2013

(86) PCT No.: PCT/JP2013/072079
§ 371 (c)(1),
(2) Date: Mar. 18, 2015

(87) PCT Pub. No.: WO2014/045776
PCT Pub. Date: Mar. 27, 2014

(65) Prior Publication Data
US 2015/0210181 A1 Jul. 30, 2015

(30) Foreign Application Priority Data
Sep. 19, 2012 (JP) .................. 2012-205253

(51) Int. Cl.
*B60W 20/00* (2016.01)
*B60H 1/00* (2006.01)
(Continued)

(52) U.S. Cl.
CPC .......... *B60L 11/1861* (2013.01); *B60L 1/003* (2013.01); *B60L 3/0023* (2013.01); *B60L 3/0046* (2013.01);
(Continued)

(58) Field of Classification Search
None
See application file for complete search history.

(56) References Cited

U.S. PATENT DOCUMENTS 4,398,081 A * 8/1983 Moad ............. B60H 1/034
123/142.5 E
5,490,572 A 2/1996 Tajiri et al.
(Continued)

FOREIGN PATENT DOCUMENTS

JP H05-262144 A 10/1993
JP H07-111702 A 4/1995
(Continued)

OTHER PUBLICATIONS

International Search Report issued in PCT/JP2013/072079 mailed on Nov. 19, 2013 (3 pages).
(Continued)

*Primary Examiner* — John R Olszewski
*Assistant Examiner* — Navid Ziaeianmehdizadeh
(74) *Attorney, Agent, or Firm* — Osha Liang LLP (57) ABSTRACT

A vehicle control system has a battery installed in a vehicle and capable of being charged with electricity supplied from an external power source outside the vehicle, an auxiliary device that operates by consuming the electricity supplied from the external power source or the battery, a communication unit that transmits information about the vehicle outward from the vehicle, and a control unit that directs the communication unit to transmit information about predetermined notice to a user of the vehicle when a predetermined condition for activating the auxiliary device is fulfilled and when the external power source is not available. The predetermined condition is that a request for activating the auxiliary device is made but the auxiliary device cannot start or continue operating.

3 Claims, 4 Drawing Sheets (51) Int. Cl.
- *B60L 11/18* (2006.01)
- *H01M 10/48* (2006.01)
- *B60L 1/00* (2006.01)
- *B60L 3/00* (2006.01)
- *H02J 7/00* (2006.01)
- *H01M 10/625* (2014.01)
- *H01M 10/615* (2014.01)
- *H01M 10/663* (2014.01)
- *H01M 10/6571* (2014.01)
- *B60K 11/06* (2006.01)
- *B60K 1/00* (2006.01)
- *H01M 10/44* (2006.01)
- *H01M 10/42* (2006.01)

(52) U.S. Cl.
CPC .......... *B60L 3/0092* (2013.01); *B60L 11/187* (2013.01); *B60L 11/1862* (2013.01); *H01M 10/48* (2013.01); *H01M 10/486* (2013.01); *H01M 10/615* (2015.04); *H01M 10/625* (2015.04); *H01M 10/6571* (2015.04); *H01M 10/663* (2015.04); *H02J 7/0004* (2013.01); *H02J 7/0029* (2013.01); *B60K 11/06* (2013.01); *B60K 2001/005* (2013.01); *B60K 2001/008* (2013.01); *B60L 2240/545* (2013.01); *B60L 2240/547* (2013.01); *B60L 2250/10* (2013.01); *B60L 2250/16* (2013.01); *H01M 10/443* (2013.01); *H01M 2010/4278* (2013.01); *H01M 2220/20* (2013.01); *Y02T 10/705* (2013.01); *Y02T 10/7005* (2013.01); *Y02T 10/7044* (2013.01); *Y02T 90/16* (2013.01)

(56) References Cited

U.S. PATENT DOCUMENTS

| | | | |
|---|---|---|---|
| 5,521,443 A | 5/1996 | Imura et al. | |
| 5,730,237 A * | 3/1998 | Matsuki | B60H 1/00278 180/65.1 |
| 8,639,413 B2 | 1/2014 | Endo | B60H 1/00392 180/65.27 |
| 8,987,927 B2 * | 3/2015 | Kitamura | E02F 9/2091 290/40 R |
| 9,037,334 B1 * | 5/2015 | Cole | B60L 11/12 701/22 |
| 9,114,686 B2 * | 8/2015 | Hashigaya | B60H 1/00428 |
| 9,136,719 B2 | 9/2015 | Ichikawa et al. | |
| 9,340,090 B2 | 5/2016 | Fukatsu | |
| 2002/0113576 A1 * | 8/2002 | Oomura | B60H 1/004 320/134 |
| 2003/0106883 A1 * | 6/2003 | Sangwan | H05B 3/84 219/203 |
| 2009/0021221 A1 * | 1/2009 | Krauer | B60L 11/1875 320/153 |
| 2009/0114463 A1 * | 5/2009 | DeVault | B60K 6/365 180/65.29 |
| 2010/0276993 A1 * | 11/2010 | King | B60L 11/12 307/9.1 |
| 2010/0280698 A1 * | 11/2010 | Ichikawa | B60K 6/445 701/22 |
| 2010/0288745 A1 * | 11/2010 | Brust | B60H 1/2218 219/205 |
| 2010/0318250 A1 * | 12/2010 | Mitsutani | B60K 1/02 701/22 |
| 2010/0318252 A1 * | 12/2010 | Izumi | B60K 6/28 701/22 |
| 2010/0324765 A1 * | 12/2010 | Iida | H01M 10/613 701/22 |
| 2012/0047928 A1 * | 3/2012 | Fukatsu | B60H 1/00392 62/150 |
| 2012/0072063 A1 * | 3/2012 | Kato | B60K 6/445 701/22 |
| 2012/0206099 A1 | 8/2012 | Ichikawa et al. | |
| 2013/0020046 A1 * | 1/2013 | Momose | B60H 1/00428 165/11.1 |
| 2013/0027882 A1 | 1/2013 | Iwasa et al. | |
| 2013/0342015 A1 * | 12/2013 | Takano | H01M 10/44 307/38 |
| 2014/0330453 A1 * | 11/2014 | Nakagawa | B60H 1/00428 701/2 |
| 2015/0028019 A1 * | 1/2015 | Kamachi | B60H 1/2218 219/484 |
| 2015/0061605 A1 * | 3/2015 | Yamazaki | B60L 1/003 320/150 |

FOREIGN PATENT DOCUMENTS

| | | |
|---|---|---|
| JP | H08-149608 A | 6/1996 |
| JP | 2001-063347 A | 3/2001 |
| JP | 2009-113674 A | 5/2009 |
| JP | 2011-050162 A | 3/2011 |
| JP | 2011-151893 A | 8/2011 |
| JP | 2012-045977 A | 3/2012 |
| JP | 2012-170181 A | 9/2012 |
| WO | 2012/081104 A1 | 6/2012 |
| WO | 2012085615 A1 | 6/2012 |

OTHER PUBLICATIONS

Written Opinion of the International Searching Authority issued in PCT/JP2013/072079 mailed on Nov. 19, 2013 (3 pages)

* cited by examiner

VEHICLE CONTROL SYSTEM, VEHICLE INFORMATION PROVIDING DEVICE, AND VEHICLE INFORMATION PROVIDING METHOD

CROSS-REFERENCE TO RELATED APPLICATION

The present application is a national stage application of PCT Application No. PCT/JP2013/072079, filed Aug. 19, 2013, and claims priority to Japanese Patent Application No. 2012-205253, filed on Sep. 19, 2012, the contents of which are herein incorporated by reference in their entirety.

BACKGROUND

Technical Field

The present invention relates to vehicle control systems, vehicle information providing devices, and vehicle information providing methods.

Related Art

For example, Patent Literature 1 (mentioned below) describes a technique for maintaining a battery installed in an electric vehicle at appropriate temperature. Patent Literature 1 teaches that a temperature of the battery is detected, and cooled air or heated air is introduced thereto depending on the detected temperature so as to regulate the temperature of the battery.

The technique of Patent Literature 1, however, may lead to a shortage of battery power by conducting the regulation of the battery temperature described above. An insufficient remaining battery level may inhibit the regulation of the temperature so that the battery cannot be maintained at appropriate temperature. For example, in a case where a user fails to connect the vehicle and an external power source, the regulation of the battery temperature cannot be carried out by use of the external power source so that a decrease of the remaining battery level may be caused since the battery of the vehicle is not connected to the external power source.

Patent Literature 1: Japanese Unexamined Patent Application Publication No. H05-262144

SUMMARY

One or more embodiments of the present invention provides a vehicle control system, a vehicle information providing device and a vehicle information providing method capable of preventing a decrease in remaining battery level in a vehicle.

According to one or more embodiments of the present invention, information about predetermined notice is transmitted to a user of a vehicle when predetermined conditions for activating an auxiliary device which operates by consuming electricity supplied from an external power source or a battery installed in the vehicle are fulfilled and when the external power source is not available.

According to one or more embodiments of the present invention, a vehicle control system comprises a battery installed in a vehicle and capable of being charged with electricity supplied from an external power source outside the vehicle, an auxiliary device that operates by consuming the electricity supplied from the external power source or the battery, a communication unit that transmits information about the vehicle outward from the vehicle, and a control unit that directs the communication unit to transmit information about predetermined notice to a user of the vehicle when a predetermined condition for activating the auxiliary device is fulfilled and when the external power source is not available. The predetermined condition is that a request for activating the auxiliary device is made but the auxiliary device cannot start or continue operating.

DETAILED DESCRIPTION

Hereinafter, embodiments of the present invention will be explained by reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
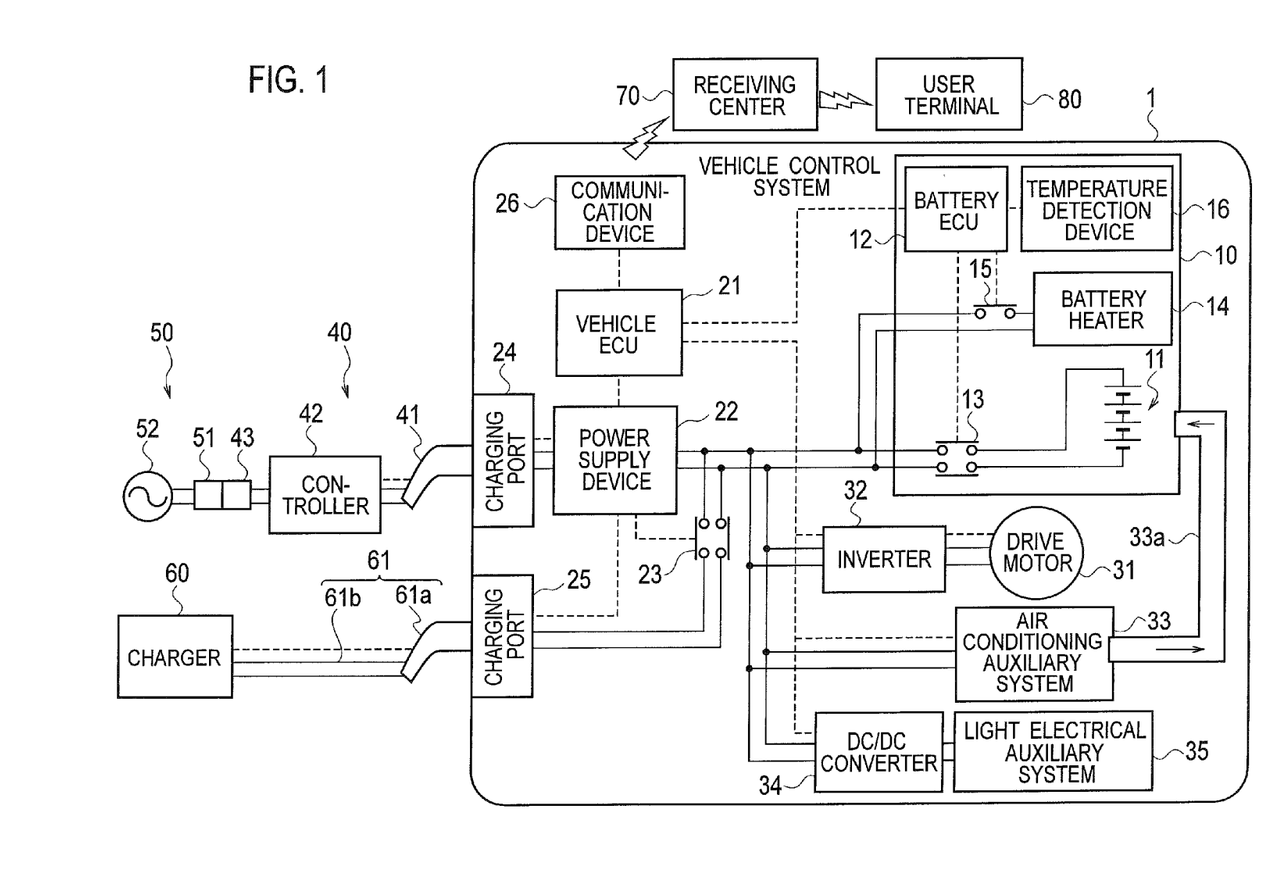
FIG. 1 is a block diagram showing a vehicle control system according to one or more embodiments of the present invention.

A vehicle control system 1 according to one or more embodiments of the present invention is configured, for example, as shown in FIG. 1. The vehicle control system 1 is implemented in an electric vehicle. The electric vehicle converts electrical energy stored in a battery 11 installed in the electric vehicle into electric power to drive. Note that, in the figure, the solid lines connecting components each represent a transfer of electricity, and the dotted lines connecting components each represent a transfer of control signals.

The vehicle control system 1 can be connected to an external power source 50 via an external charging cable 40. The external power source 50 includes a commercial power source 52 and a power source socket 51. The commercial power source 52 is a supply source of a commercial power supply of, for example, 50 Hz and 200 V. The power source socket 51 is an interface connected to the external charging cable 40.

The external charging cable 40 includes a power source plug 43, a controller 42 and a charging plug 41. The power source plug 43 is connected to the power source socket 51 of the external power source 50. The controller 42 functions to detect a short circuit in the system during charge to break wires and functions to send current capacity signals to the vehicle. The charging plug 41 is connected to a charging port 24 of the vehicle control system 1.

The vehicle control system 1 can be connected to a charger 60 via a charger charging cable 61.

The charger 60 is a charging device located outside the vehicle for supplying charging electricity directly to the electric vehicle. The charger charging cable 61 includes a charging plug 61a and a connection cable 61b. The vehicle control system 1 thus can charge a battery device 10 with the electricity.

The vehicle control system 1 can communicate with a user terminal 80 via a receiving center 70 by radio. Here, the receiving center 70 and the user terminal 80 may be connected together through a wire.

The receiving center 70 is a data center that communicates information with a communication device 26 in the vehicle control system 1. The receiving center 70 and the communication device 26 can transfer radio signals therebetween. The user terminal 80 communicates information with the communication device 26 via the receiving center 70. The user terminal 80 is, for example, a mobile phone, a smart phone, or a PC.

The vehicle control system 1 includes the battery device 10, a vehicle ECU 21, a power supply device 22, a charging relay 23, two charging ports 24 and 25, and the communication device 26.

The charging port 24 is a connector for connecting the electric vehicle with the external power source 50 via the external charging cable 40. The charging port 24 supplies AC power supplied from the external power source 50 to the power supply device 22 via the external charging cable 40.

The charging port 25 is a connector for connecting the electric vehicle with the charger 60 via the charger charging cable 61. The charging port 25 supplies DC power supplied from the charger 60 to the charging relay 23 via the charger charging cable 61. The charging relay 23 opens or closes in accordance with the control by the power supply device 22 so as to connect or break between the charging port 25 and the battery device 10. The charging relay 23 thus connects or breaks between the charger 60 and the battery device 10.

The power supply device 22 converts the AC power supplied from the external power source 50 into DC power and raises the voltage of the DC power so as to supply the DC power to the battery device 10. The power supply device 22 also controls the opening and closing operation of the charging relay 23.

The vehicle ECU 21 is a control device that determines the conditions of the electric vehicle to perform overall control including driving control and charging control. The vehicle ECU 21 controls the battery 11 of the electric vehicle to keep at appropriate temperature. The vehicle ECU 21 keeps controlling the temperature not only when the electric vehicle is driving but also when the power of the electric vehicle is turned off. During the control, the vehicle ECU 21 activates a battery heater 14 to prevent a decrease in temperature of the battery 11. Accordingly, deterioration or freezing of the battery 11 can be prevented. The vehicle ECU 21 uses the electricity of the external power source 50 to regulate the temperature of the battery 11 when the external power source 50 is connected to the electric vehicle. The vehicle ECU 21 may regulate the temperature of the battery 11 by use of the DC power supplied from the charger 60. The vehicle ECU 21 uses the electricity of the battery 11 to regulate the temperature of the battery 11 when the electric vehicle is not connected with the external power source 50 and is thus in a plug-off state.

The vehicle ECU 21 also determines whether predetermined conditions for activating an auxiliary device such as the battery heater 14 or an air conditioning auxiliary system 33 are fulfilled and whether the external power source 50 is available. When the external power source 50 is not available, the vehicle ECU 21 directs the communication device 26 to transmit (provide) information about predetermined notice to the user of the electric vehicle. The vehicle ECU 21 thus serves as a control means and as a vehicle information providing device. The operation of the vehicle ECU 21 will be explained in detail below.

The communication device 26 serves as a communication means capable of transmitting information about the electric vehicle to the outside of the electric vehicle. The communication device 26 transmits predetermined information to the receiving center 70 in accordance with the control by the vehicle ECU 21. The information transmitted from the communication device 26 to the outside of the electric vehicle includes predetermined notice provided to the user of the electric vehicle. Here, addresses such as an IP address and an email address assigned to the user terminal 80 are preliminarily entered in the communication device 26. The predetermined notice includes, for example, notice to urge the user to supply the electricity from the external power source 50 to the electric vehicle.

The battery device 10 includes the battery 11, a battery ECU 12, a battery relay 13, the battery heater 14, a battery heater relay 15, and a temperature detection device 16.

The battery 11 includes an assembled battery capable of charge and discharge of electricity. The battery 11 can be charged with electricity supplied from the external power source 50 located outside the electric vehicle. The battery device 10 serves as an electricity generation device for converting the electricity stored in the battery 11 into DC power to supply it to each component in the electric vehicle.

The battery relay 13 is connected to the battery 11 on one side thereof. The battery relay 13 is connected, on the other side, to the battery heater relay 15, an inverter 32, the charging relay 23 and the like. The battery relay 13 functions to connect or break between the external power source 50, the charger 60 or the inverter 32 and the battery 11. The operation of the battery relay 13 is controlled by the battery ECU 12.

The battery heater 14 functions to regulate the temperature of the battery 11. The battery heater 14 generates heat to keep the battery 11 at predetermined temperature. The battery heater relay 15 functions to connect or break between the external power supply 50 or the charger 60 and the battery heater 14. The operation of the battery heater relay 15 is controlled by the battery ECU 12. The heat generation of the battery heater 14 is turned on/off by the operation of the battery heater relay 15.

The temperature detection device 16 detects the temperature of the battery 11. The battery temperature detected by the temperature detection device 16 is read in the battery ECU 12.

The battery ECU 12 controls the entire battery device 10. The battery ECU 12 monitors the conditions of the battery 11 including the battery temperature and the remaining battery level (SOC). The battery ECU 12 controls the opening and closing operation of the battery relay 13 to regulate the charge and discharge of the battery 11. The battery ECU 12 controls the opening and closing operation of the battery heater relay 15 to control the battery heater 14.

The battery ECU 12 outputs, to the vehicle ECU 21, a request to regulate the temperature of the battery 11 (hereinafter, referred to as "a battery temperature regulation request") depending on the battery temperature detected by the temperature detection device 16. The battery ECU 12 also transmits information about the remaining battery level to the vehicle ECU 21.

The vehicle control system 1 includes a drive motor 31, the inverter 32, the air conditioning auxiliary system 33, a DC/DC converter 34, and a light electrical auxiliary system 35.

The drive motor 31 generates drive torque of the electric vehicle. The drive motor 31 is activated by AC power supplied from the inverter 32. The inverter 32 converts DC power supplied from the battery 11 into AC power. Here, the inverter 32 controls a voltage and frequency of AC power to supply the AC power to the drive motor 31.

The air conditioning auxiliary system 33 operates in such a manner as to consume electricity supplied from the external power source 50 or the battery 11 installed in the electric vehicle. The air conditioning auxiliary system 33 includes a cooling device and a heating device for regulating temperature in the interior of the electric vehicle and the battery device 10. The air conditioning auxiliary system 33 is activated by DC power supplied from the battery 11. The air conditioning auxiliary system 33 supplies cooled air or heated air of which temperature is regulated to the battery device 10 via an air supply passage 33a.

The light electrical auxiliary system 35 includes a 12V battery, head lamps, wipers, meters, a navigation system, lightings, and several types of control units. The light electrical auxiliary system 35 is activated by DC power supplied from the DC/DC converter 34. The DC/DC converter 34 lowers a voltage of DC power of the battery 11 as appropriate (for example, 12 V) to supply the DC power to the light electrical auxiliary system 35.

Note that the auxiliary device installed in the electric vehicle includes a component other than the temperature regulation means for the battery 11 such as the battery heater 14 or the air conditioning auxiliary system 33. An example of the other auxiliary device is a device for automatically charging the 12V battery with electricity of the battery 11. Such an automatic charging function is activated by the electric vehicle automatically by use of the electricity of the battery 11 regardless of intention of the user.

Figure 2:
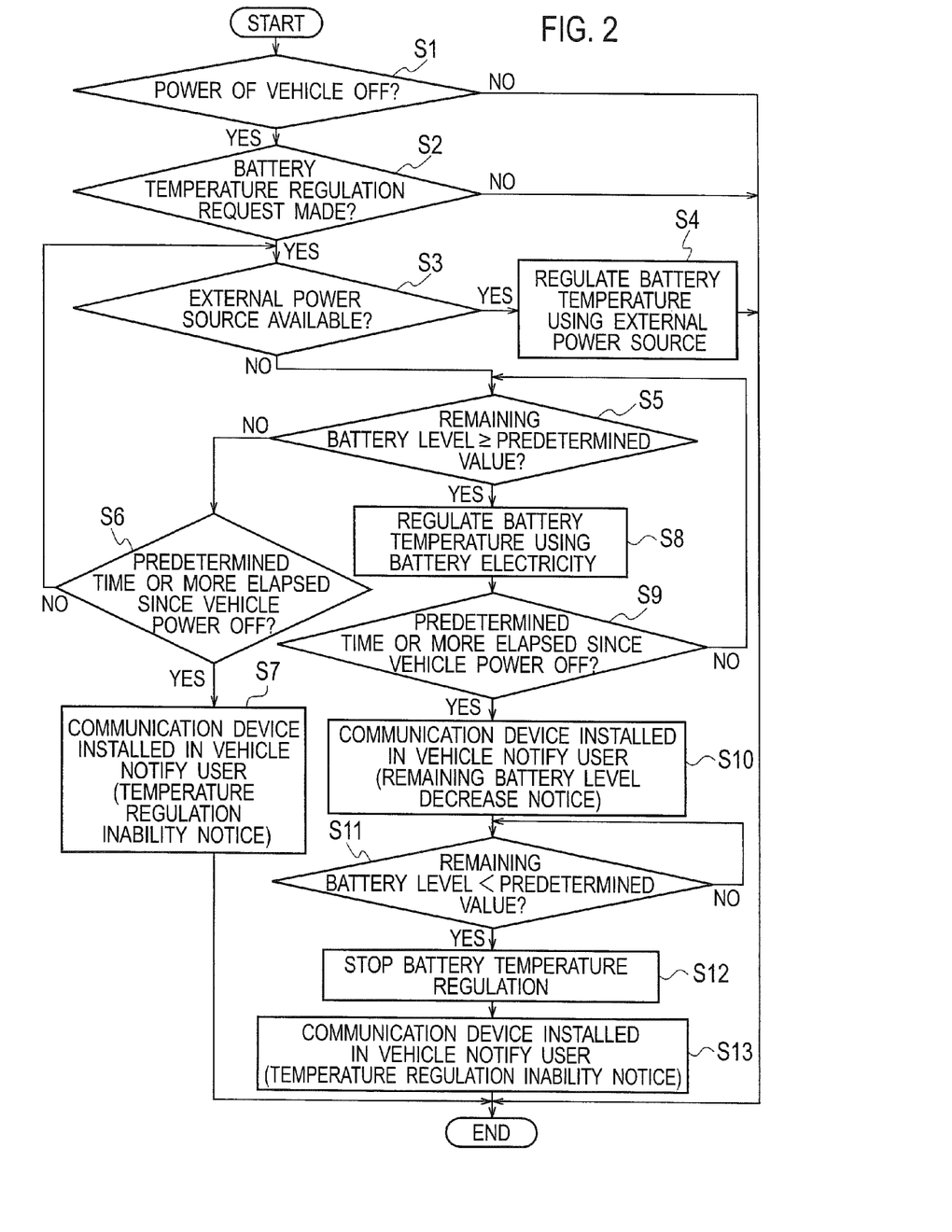
FIG. 2 is a flow chart showing an operation of the vehicle control system according to one or more embodiments of the present invention.

Next, the operation of providing predetermined notice to the user of the electric vehicle in the vehicle control system when the predetermined conditions for activating the auxiliary device are fulfilled and when the external power source 50 is not available, will be explained by reference to the flow chart shown in FIG. 2.

First, in step S1, the vehicle ECU 21 determines whether the power of the electric vehicle is OFF. When the vehicle ECU 21 determines that a power switch or the like (not shown in the figure) has been turned off, the process proceeds to step S2. When the power of the electric vehicle is ON, the vehicle ECU 21 determines that the user stays in the vehicle because the user is driving or the like and finishes the process so as not to provide any notice to the user.

In the following step S2, the vehicle ECU 21 determines whether the battery temperature regulation request is made. For example, the temperature detection device 16 detects the battery temperature reaching a predetermined temperature (for example, −17° C. or lower). The battery ECU 12 outputs the battery temperature regulation request to the vehicle ECU 21 when the battery ECU 12 determines that the battery temperature detected by the temperature detection device 16 is the predetermined temperature or lower. When the battery temperature regulation request is output to the vehicle ECU 21, the process proceeds to step S3. When there is no battery temperature regulation request, the vehicle ECU 21 finishes the process so as not to provide any notice to the user.

In the following step S3, the vehicle ECU 21 determines whether the electricity from the external power source 50 is available. Namely, the vehicle ECU 21 determines whether the electricity from the external power source 50 can be used for the battery temperature regulation request. When the electricity from the external power source 50 is available, the process proceeds to step S4.

In step S4, the vehicle ECU 21 uses the electricity from the external power source 50 to conduct the regulation of temperature of the battery 11. According to the control by the vehicle ECU 21, the vehicle control system 1 activates the battery heater 14 or the air conditioning auxiliary system 33 to regulate the temperature of the battery 11. When the temperature of the battery 11 is low, the vehicle control system 1 turns on the battery heater relay 15 to activate the battery heater 14 so as to increase the temperature of the battery 11. Alternatively, when the temperature of the battery 11 is low, the vehicle control system 1 may activate the heating device of the air conditioning auxiliary system 33 so as to supply heated air to the battery 11 via the air supply passage 33a. When decreasing the temperature of the battery 11, the vehicle control system 1 may supply cooled air to the battery 11 from the air conditioning auxiliary system 33 via the air supply passage 33a.

In step S3, when the vehicle ECU 21 determines that the electricity from the external power source 50 is not available, the process proceeds to step S5. In step S5, the vehicle ECU 21 determines whether the remaining battery level of the battery 11 is a predetermined value or higher. For example, the vehicle ECU 21 determines whether SOC as the remaining battery level is 30% or higher. When the remaining battery level is not the predetermined value or higher, the process proceeds to step S6. When the remaining battery level is the predetermined value or higher, the process proceeds to step S8.

In step S6, the vehicle ECU 21 determines whether a predetermined time or more has elapsed since the point where the power of the electric vehicle is turned off. When the predetermined time or more has elapsed since the point where the power of the electric vehicle is turned off, the process proceeds to step S7. When the predetermined time or more has not passed yet, the process returns to step S3.

In step S7, the vehicle ECU 21 controls the communication device 26 installed in the electric vehicle so as to provide the user with predetermined notice. In particular, the vehicle ECU 21 directs the communication device 26 to transmit information notifying that the user is urged to bring the external power source 50 to a state capable of supplying electricity to the electric vehicle (temperature regulation inability notice) because the vehicle ECU 21 cannot conduct the regulation of temperature of the battery 11 in response to the battery temperature regulation request. This temperature regulation inability notice is transmitted from the communication device 26 to the user terminal 80 via the receiving center 70. The user terminal 80, for example, displays the temperature regulation inability notice so as to notify the user of the temperature regulation inability.

As described above, when the predetermined conditions that the battery temperature regulation request has been made, the remaining battery level is not the predetermined value or higher, and the predetermined time or more has elapsed since the point where the power of the electric vehicle is turned off, are fulfilled and when the electricity from the external power source 50 is not available, the vehicle control system 1 provides the user with the temperature regulation inability notice. The predetermined conditions include at least the battery temperature regulation request. Namely, the predetermined conditions include the condition for activating the battery heater 14 or the air conditioning auxiliary system 33.

When it is determined that the remaining battery level is not the predetermined value or higher (in step S5), the regulation of temperature of the battery 11 is inhibited to prevent the remaining battery level from further decreasing due to the execution of the temperature regulation so as to avoid an excessive decrease in remaining driving range of the electric vehicle or a shortage of electricity of the battery 11.

Further in step S6, the vehicle control system 1 provides the user with the temperature regulation inability notice under the condition that the predetermined time or more has elapsed since the point where the power of the electric vehicle is turned off. Namely, there is a time lag before providing the temperature regulation inability notice. Thus, the notice is not provided until the predetermined time has elapsed in view of the step that the user brings the electricity of the external power source 50 to an available state by, for example, connecting the external charging cable 40 to the electric vehicle after the user turns off the power of the electric vehicle and gets out thereof. Although the predetermined time is an arbitrary time, the predetermined time may be set to several tens of minutes so as not to provide the user with the temperature regulation inability notice while the user is connecting the external charging cable 40 to the electric vehicle.

After the temperature regulation inability notice is provided, the external power source 50 is conceived to be connected to the vehicle control system 1 via the external charging cable 40 by the user. Then, the determination in step S3 is YES so that the battery temperature regulation is conducted by use of the electricity from the external power source 50 in step S4.

In step S8 to which the process proceeds in step S5 when it is determined that the remaining battery level is the predetermined value or higher, the vehicle control system 1 regulates the temperature of the battery 11 by use of the electricity of the battery 11. The vehicle ECU 21 then controls the battery ECU 12 so as to turn on the battery relay 13 and the battery heater relay 15.

In the following step S9, the vehicle ECU 21 determines whether the predetermined time or more has elapsed since the point where the power of the electric vehicle is turned off. When the predetermined time or more has elapsed since the point where the power of the electric vehicle is turned off, the process proceeds to step S10. When the predetermined time or more has not passed yet, the process returns to step S5.

In step S10, the vehicle ECU 21 controls the communication device 26 installed in the electric vehicle so as to provide the user with predetermined notice. In particular, the vehicle ECU 21 directs the communication device 26 to transmit information about a decrease of the remaining battery level (remaining battery level decrease notice) because the electricity of the battery 11 is used to regulate the temperature of the battery 11. The remaining battery level decrease notice may include notice that the user is urged to bring the external power source 50 to a state capable of supplying the electricity to the electric vehicle in order to avoid decreasing the remaining battery level. This remaining battery level decrease notice is transmitted from the communication device 26 to the user terminal 80 via the receiving center 70. The user terminal 80, for example, displays the remaining battery level decrease notice so as to notify the user of the decrease of the remaining battery level.

As described above, when the predetermined conditions that the battery temperature regulation request has been made, the temperature of the battery 11 has been regulated by use of the electricity of the battery 11, and the predetermined time or more has elapsed since the point where the power of the electric vehicle is turned off, are fulfilled, the vehicle control system 1 provides the user with the remaining battery level decrease notice. The predetermined conditions include the battery temperature regulation request. Namely, the predetermined conditions include the condition for activating the battery heater 14 or the air conditioning auxiliary system 33.

In the following step S11, the vehicle ECU 21 determines whether the remaining battery level falls below the predetermined value. For example, the vehicle ECU 21 determines whether SOC as the remaining battery level falls below 30%. When the remaining battery level falls below the predetermined value, the process proceeds to step S12. When the remaining battery level is not below the predetermined value, the vehicle ECU 21 repeats the determination of step S11.

After transmitting the remaining battery level decrease notice in step S10, the external power source 50 is conceived to be connected to the vehicle control system 1 via the external charging cable 40 by the user. In such a case, the vehicle ECU 21 may finish this process after detecting the connection of the external charging cable 40 and then conducting the regulation of temperature of the battery 11 by use of the electricity from the external power source 50.

In step S12, the vehicle ECU 21 stops regulating the temperature of the battery 11 by use of the electricity of the battery 11. The vehicle ECU 21 then controls the battery ECU 12 so as to turn off the battery relay 13 and the battery heater relay 15. Accordingly, an electricity shortage of the battery 11 is prevented.

In the following step S13, the vehicle ECU 21 directs the communication device 26 to transmit the information that the user is urged to bring the external power source 50 to a state capable of supplying the electricity to the electric vehicle (temperature regulation inability notice) because the vehicle ECU 21 cannot conduct the regulation of temperature of the battery 11 in response to the battery temperature regulation request. This temperature regulation inability notice is transmitted from the communication device 26 to the user terminal 80 via the receiving center 70. The user terminal 80, for example, displays the temperature regulation inability notice so as to notify the user of the temperature regulation inability.

Figure 3:
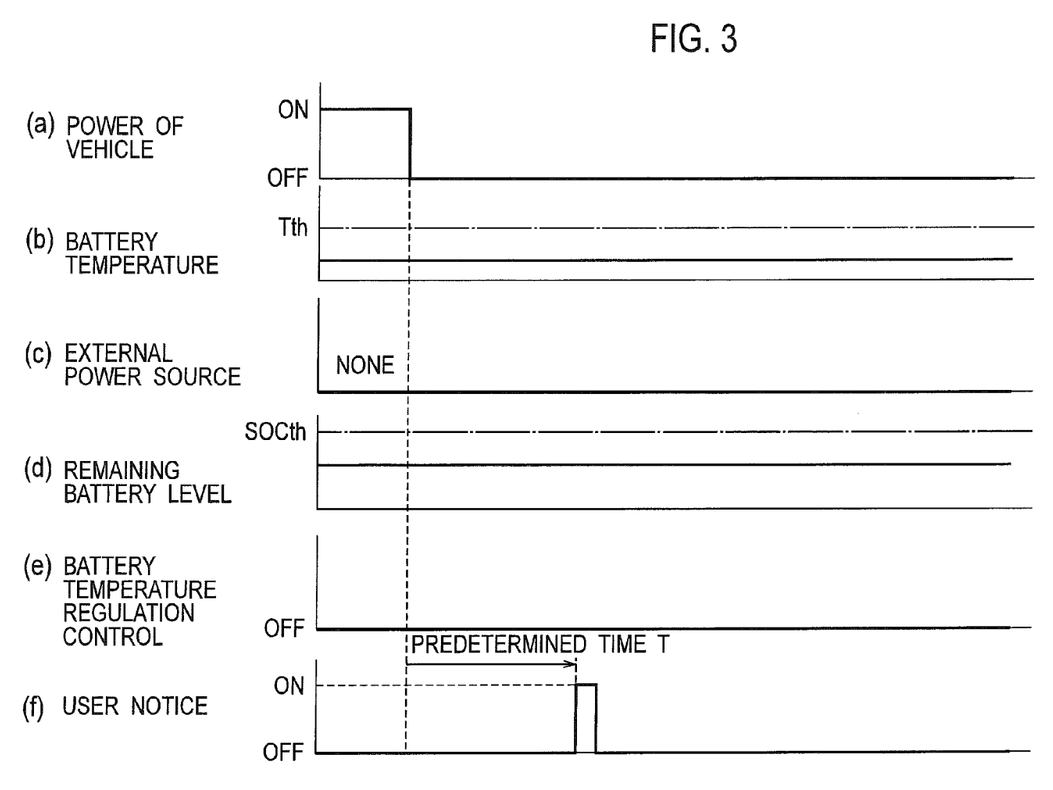
FIG. 3 is a timing chart showing an operation of the vehicle control system according to one or more embodiments of the present invention.

As described above, the vehicle ECU 21 determines whether the predetermined conditions including: (a) the power of the electric vehicle; (b) the battery temperature; (c) the availability of electricity of the external power source 50; and (d) the remaining battery level, for example, as shown in FIG. 3 are fulfilled. In particular, the vehicle ECU 21 determines in step S1 that (a) the power of the electric vehicle is turned off. The vehicle ECU 21 determines in step S2 that (b) the battery temperature is lower than or equal to the predetermined value Tth at which the battery temperature regulation request is made. The vehicle ECU 21 determines in step S3 that (c) the electricity of the external power source 50 is not available. The vehicle ECU 21 determines in step S5 that (d) the remaining battery level is lower than or equal to the predetermined value SOCth.

When the conditions (a), (b) and (d) are fulfilled and when the external power source 50 is not available as indicated by condition (c), the vehicle ECU 21 does not conduct the regulation of temperature of the battery 11 as indicated by condition (e). When the vehicle ECU 21 determines in step S6 that the predetermined time T has elapsed since the point where the power of the electric vehicle is turned off, the vehicle ECU 21 transmits the temperature regulation inability notice to the user terminal 80 in step S7 as indicated by condition (f).

Figure 4:
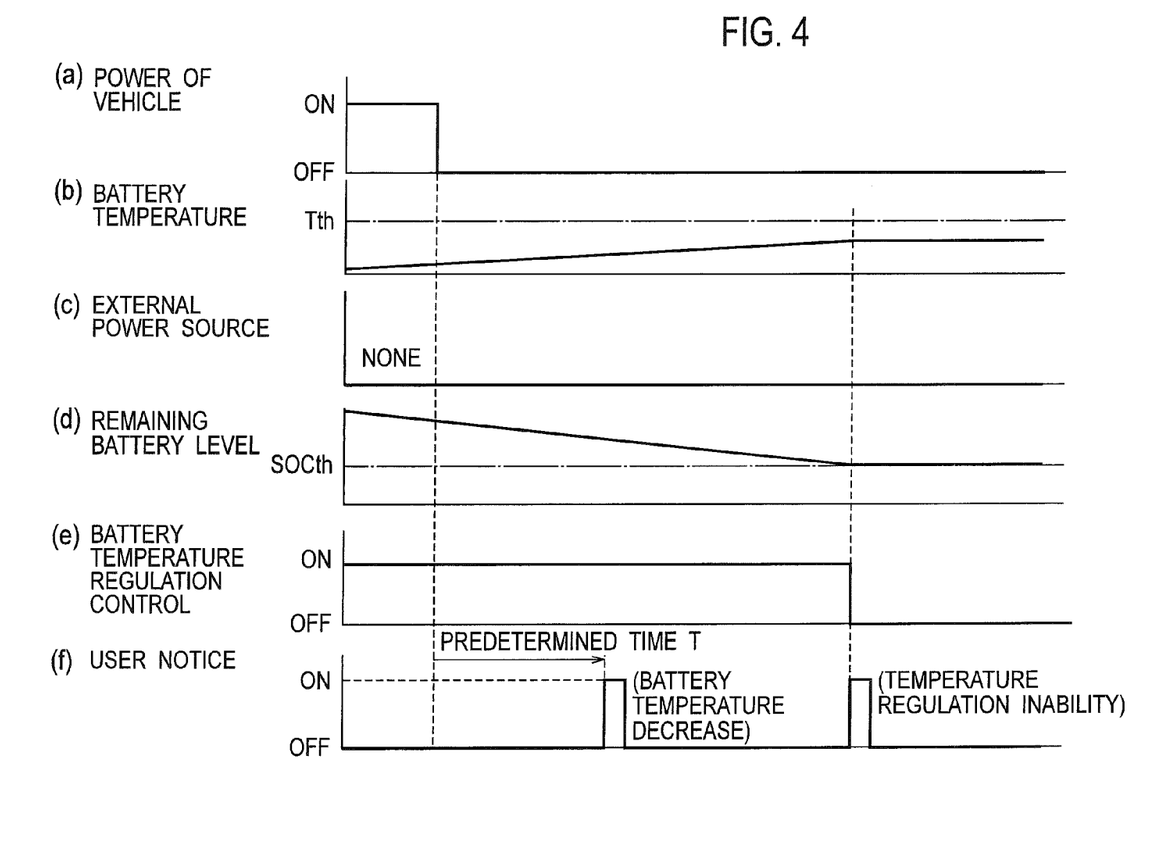
FIG. 4 is a timing chart showing another operation of the vehicle control system according to one or more embodiments of the present invention.

Alternatively, as shown in FIG. 4, the vehicle ECU 21 may conduct the regulation of temperature of the battery 11 in a manner such that, after the power of the electric vehicle is turned off, the vehicle ECU 21 does not use the electricity of the external power source 50 as indicated by condition (c) but uses the electricity of the battery 11 as indicated by condition (e). When the regulation of temperature of the battery 11 is carried out as described above, the battery temperature increase as indicated by condition (b) but the remaining battery level gradually decreases as indicated by condition (d).

When the predetermined time T has elapsed since the point where the power of the electric vehicle is turned off, the vehicle ECU 21 transmits, to the user terminal 80, the remaining battery level decrease notice as indicated by condition (f). Subsequently, when the remaining battery level falls to or below the predetermined value SOCth as indicated by condition (d) and when the battery temperature is the predetermined value Tth or lower as indicated by condition (b), the vehicle ECU 21 stops regulating the temperature of the battery 11 as indicated by condition (e). Further, the vehicle ECU 21 transmits, to the user terminal 80, the temperature regulation inability notice as indicated by condition (f).

As explained in detail above, the vehicle control system according to one or more embodiments of the present invention conducts the control of transmitting the information about predetermined notice to the user of the electric vehicle when the predetermined conditions for activating the auxiliary device such as the battery heater 14 are fulfilled and when the external power source 50 is not available. Thus, the vehicle control system can provide the user with the notice even when the electric vehicle is not connected with the external power source 50 and is thus in a plug-off state and the battery heater 14 is activated in order to, for example, prevent a decrease in temperature of the battery 11.

Accordingly, the vehicle control system can notify the user of a decrease of the remaining battery level that the user does not intend because of, for example, the regulation of temperature of the battery 11, or deterioration or the like of the battery 11 because of inability to regulate the temperature of the battery 11.

In addition, the vehicle control system can provide the user terminal 80 with the notice that the user is urged to bring the external power source 50 to a state capable of supplying the electricity to the electric vehicle even when the user leaves the electric vehicle.

In addition, the vehicle control system can prevent the remaining battery level from decreasing because of automatic operation which is conducted even when the power of the electric vehicle is OFF.

The vehicle control system described above provides the notice under the predetermined condition that the request to activate the auxiliary device such as the battery heater 14 is made but the auxiliary device cannot start or continue operating. Namely, the vehicle control system provides the user with the notice when it is determined in step S5 that the remaining battery level is the predetermined value or lower at the point where the battery temperature regulation request is made, or when it is determined in step S11 that the remaining battery level falls to or below the predetermined value as a result of consumption of electricity of the battery 11.

The vehicle control system thus can provide the user with the notice that the user is urged to take an appropriate step when the auxiliary device such as the battery heater 14 is required to operate but cannot start or continue operating because of a shortage of electricity of the battery 11 or a fault in connection of the external charging cable 40. Accordingly, the risk of causing defects derived from a decrease of the remaining battery level of the battery 11 of the electric vehicle can be reduced.

According to the vehicle control system, since the information notifying the user of the temperature regulation inability is transmitted when the auxiliary device cannot start or continue operating, the user can be urged to bring the external power source 50 to a state capable of supplying the electricity to the electric vehicle because the temperature of the battery 11 cannot be regulated.

The vehicle control system described above provides the notice under the predetermined condition that the auxiliary device starts operating by use of the electricity of the battery 11. When the auxiliary device starts operating by use of the electricity of the battery 11, the user can be urged to take a necessary step due to the notice. Accordingly the risk that the state of charge of the battery 11 decreases while the user does not notice it, can be avoided.

The vehicle control system transmits the information notifying the user of the decrease of the remaining battery level when the auxiliary device starts operating by use of the electricity of the battery 11. The vehicle control system thus can avoid the risk that the remaining battery level decreases because of the regulation of temperature of the battery 11 by use of the electricity of the battery 11.

The vehicle control system described above determines the predetermined conditions after a lapse of predetermined time from the point where the power of the electric vehicle is turned off, so as to avoid providing the notice to the user before the user brings the external power source 50 to a state capable of supplying the electricity to the electric vehicle after the user parks the electric vehicle. For example, the vehicle control system can avoid providing the notice to the user before the user finishes connecting the external charging cable 40 or the charger charging cable 60 to the electric vehicle.

The vehicle control system described above provides no notice to the user when the electric vehicle is in a state capable of driving, for example, in a driving mode. The vehicle control system thus can avoid providing the user with unnecessary notice when the auxiliary device is activated by use of the electricity of the battery 11 during driving.

The vehicle control system described above is a device in which the auxiliary device regulates the temperature of the battery 11 so as to transmit the notice to the user when the device is activated. The vehicle control system thus can provide the user with the notice that the user is required to bring the external power source 50 to a state capable of supplying the electricity to the electric vehicle even when the regulation of temperature of the battery 11 is automatically carried out while the electric vehicle is stopped.

It should be noted that the embodiments described above are merely examples of the present invention. Thus, the present invention is not limited to the embodiments described above, and various modifications can, of course, be made depending on design or the like according to other embodiments without departing from the scope of claims.

One or more embodiments of the present invention can provide a user of a vehicle with predetermined notice when predetermined conditions for activating an auxiliary device are fulfilled and when an external power source is not available so as to prevent a remaining battery level of the vehicle from decreasing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 BATTERY
14 BATTERY HEATER
33 AIR CONDITIONING AUXILIARY SYSTEM
35 LIGHT ELECTRICAL AUXILIARY SYSTEM
26 COMMUNICATION DEVICE
50 EXTERNAL POWER SOURCE
12 VEHICLE ECU

The invention claimed is:

1. A vehicle control system comprising:
   a battery installed in a vehicle and configured to be charged with electricity supplied from an external power source outside the vehicle;
   an auxiliary device configured to operate by consuming the electricity supplied from the external power source or the battery;
   a communication device configured to transmit information about the vehicle outward from the vehicle; and
   a control circuitry configured to direct the communication device to transmit information about a predetermined notice to a user of the vehicle when a predetermined condition for activating the auxiliary device is fulfilled and when the external power source is not available,
   wherein the predetermined condition is that a request for activating the auxiliary device is made, remaining battery level of the battery is a predetermined value or higher, and the auxiliary device starts operating via the electricity from the battery, and
   wherein, when the predetermined condition is fulfilled, the control circuitry directs the communication device to transmit information about a decrease in remaining battery level to notify that the remaining battery level decreases.

2. The vehicle control system according to claim 1, wherein the control circuitry determines the predetermined condition after a lapse of a predetermined time from a point where a power of the vehicle is turned off.

3. The vehicle control system according to claim 1, wherein the control circuitry does not provide the notice when the vehicle drives.

* * * * *